(12) United States Patent
Sohn et al.

(10) Patent No.: US 8,023,228 B2
(45) Date of Patent: Sep. 20, 2011

(54) HEAT ASSISTED MAGNETIC RECORDING HEAD AND METHOD OF MANUFACTURING THE SAME

(75) Inventors: Jin-seung Sohn, Seoul (KR); Myung-bok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1423 days.

(21) Appl. No.: 11/510,796

(22) Filed: Aug. 28, 2006

(65) Prior Publication Data

US 2007/0159720 A1 Jul. 12, 2007

(30) Foreign Application Priority Data

Jan. 10, 2006 (KR) .................. 10-2006-0002688

(51) Int. Cl.
*G11B 5/00* (2006.01)
(52) U.S. Cl. ...................................................... 360/128
(58) Field of Classification Search ............... 360/128
See application file for complete search history.

(56) References Cited

U.S. PATENT DOCUMENTS

| | | | |
|---|---|---|---|
| 6,873,576 B1 | 3/2005 | Van Kesteren | |
| 7,492,804 B2 * | 2/2009 | Tawa | 372/64 |
| 7,710,686 B2 * | 5/2010 | Kim et al. | 360/125.3 |
| 2004/0001420 A1 * | 1/2004 | Challener | 369/112.27 |
| 2005/0213436 A1 * | 9/2005 | Ono et al. | 369/13.02 |
| 2007/0230048 A1 * | 10/2007 | Hasegawa | 360/126 |

FOREIGN PATENT DOCUMENTS

| | | |
|---|---|---|
| JP | 05-054420 A | 3/1993 |
| JP | 05-325215 A | 12/1993 |
| JP | 09-106569 A | 4/1997 |
| JP | 2002-100005 A | 4/2002 |
| JP | 2003-6803 A | 1/2003 |
| JP | 2003-045004 A | 2/2003 |
| JP | 2003-114184 A | 4/2003 |
| JP | 2003-534622 A | 11/2003 |
| JP | 2005-004901 A | 1/2005 |
| WO | WO 01/97214 A3 | 12/2001 |

OTHER PUBLICATIONS

Japanese Patent Office Notice of Decision of Rejection dated Nov. 10, 2009.
Communication from the Japanese Patent Office dated Feb. 15, 2011, in Japanese Application No. 2006-257544.

* cited by examiner

*Primary Examiner* — David D Davis
(74) *Attorney, Agent, or Firm* — Sughrue Mion, PLLC (57) ABSTRACT

A heat assisted magnetic recording (HAMR) head and manufacturing method are provided. The HAMR head is mounted on a slider having an air-bearing surface (ABS) and includes a substrate; a recording unit formed on the substrate and having a stepped end; a waveguide located in a space formed by the stepped end; and a near field light emission (NFE) pole located adjacent to the recording unit and having an end located on a same plane as the ABS. The method includes forming a cladding layer on a substrate; forming a first metal layer on the cladding layer; etching a part of the first metal layer; forming a core layer on the etched region; forming a refraction part in a part of the core layer; forming a second metal layer the first metal layer and the core layer; and forming a recording unit on the second metal layer.

13 Claims, 13 Drawing Sheets

HEAT ASSISTED MAGNETIC RECORDING HEAD AND METHOD OF MANUFACTURING THE SAME

CROSS-REFERENCE TO RELATED PATENT APPLICATION

This application claims priority from Korean Patent Application No. 10-2006-0002688, filed on Jan. 10, 2006, in the Korean Intellectual Property Office, the disclosure of which is incorporated herein in its entirety by reference.

BACKGROUND OF THE INVENTION

1. Field of the Invention

Device and methods consistent with the present invention relate to a heat assisted magnetic recording (HAMR) head including a near field light emitter having improved structure and arrangement.

2. Description of the Related Art

There is active interest in increasing a recording density in a technical field of magnetic information recording. As the recording density increases, the bit size of a recording medium that records unit information is decreased. However, since a signal magnetic field from a recording medium decreases as the bit size decreases, it is required to reduce noise in order to achieve a proper signal-to-noise ratio (SNR) during reproduction. Since noise originates predominantly from a magnetization transition region of the recording medium, it is possible to achieve a proper SNR by reducing the size of grains constituting a recording bit and thus reducing transition noise.

The spins of respective grains should maintain their recorded directions without thermal disturbance in order to stably maintain information recorded on the recording medium. For that purpose, the ratio of magnetic anisotropy energy to thermal energy, i.e., $K_u V/K_B T$ should have a sufficiently large value of more than 60. Here, $K_u$ is magnetic anisotropy energy density of a recording medium, V is the size of a grain, $K_B$ is the Boltzmann constant, and T is absolute temperature. Also, to achieve thermal stability in a high density recording medium having small grains, it is required to increase magnetic anisotropy energy density of the recording medium at a certain temperature. Since the magnetic anisotropy energy density is proportional to coercive force, a material having large coercive force needs to be used.

However, when a material having the large coercive force is used in order to achieve thermal stability, recording itself may be impossible due to a limitation in the intensity of a magnetic field generated from a magnetic recording head.

To address this problem, HAMR has been developed. In HAMR, heat is applied to the local area of a recording medium to reduce a coercive force of the local area so that the local area is easily magnetized by a magnetic field applied from a magnetic recording head. It is possible to achieve thermal stability using HAMR even when the grains of a recording medium are small.

A method of applying heat on the local area of the recording medium includes illuminating the recording medium using a laser ray.

Figure 1:
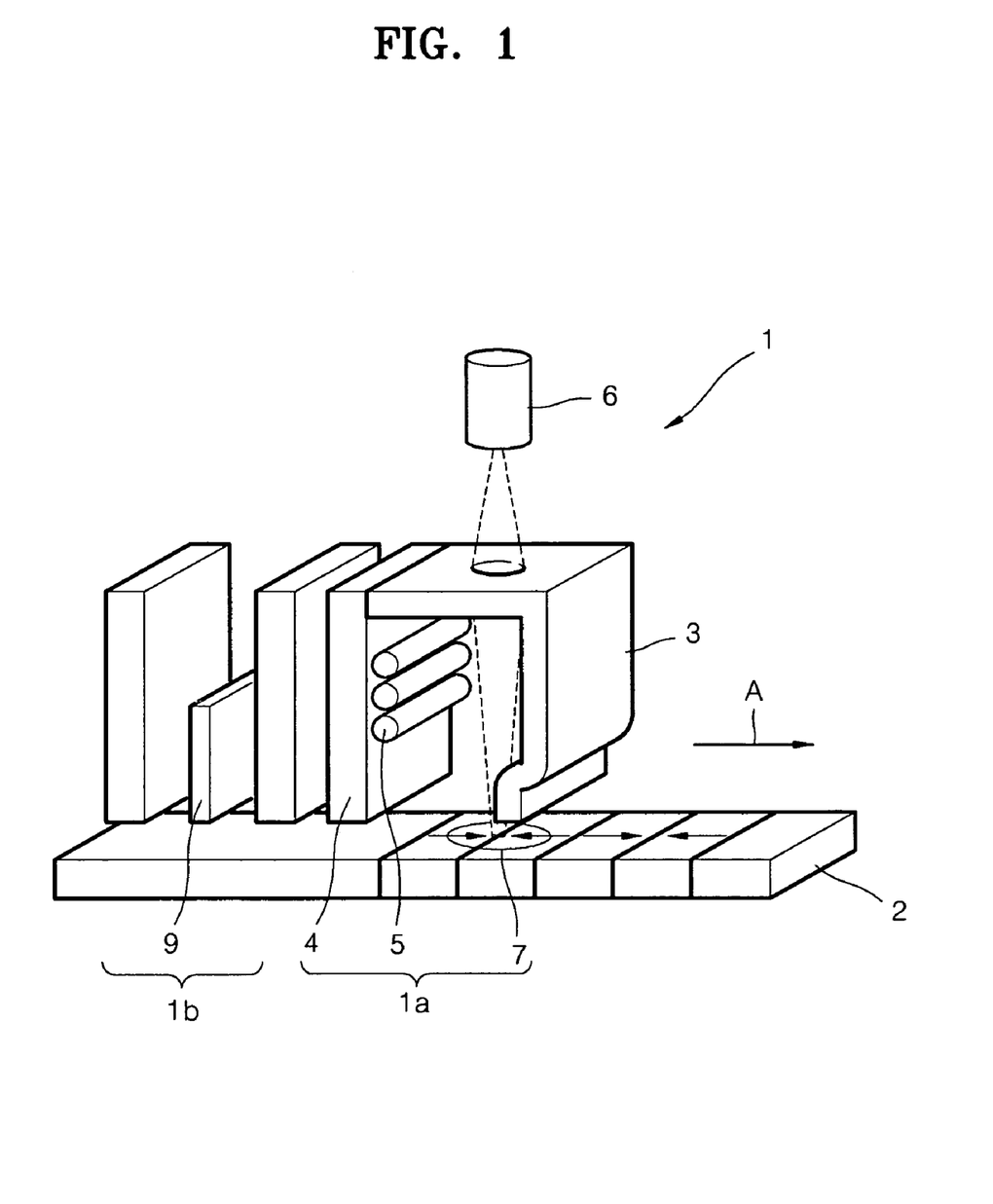
FIG. 1 is a schematic perspective view of a related art HAMR head.

FIG. 1 is a schematic perspective view of a related art HAMR head 1. Referring to FIG. 1, the HAMR head 1 includes a recording unit 1a which converts information into a magnetic signal and applies the converted magnetic signal onto a recording medium 2; a reproduction unit 1b including a reproduction device 9 which detects a recorded bit from the recording medium 2; and a light source 6 for thermal assistance. The recording unit 1a includes a recording pole 3 which applies a magnetic field onto the recording medium 2, a return pole 4 constituting a magnetic circuit in cooperation with the recording pole 3, and an induction coil 5 inducing the magnetic field on the recording pole 3. Assuming that the recording medium 2 moves in a direction A, a laser ray illuminated from the light source 6 such as a laser diode provides a light spot 7 on part of the recording medium 2, so that a coercive force of the part of the recording medium 2 illuminated by the light source 6 reduces right after the part of the recording medium 2 is heated by the laser ray. The part exposed to the light spot 7 is magnetized by leakage magnetic flux generated from the recording pole 3. Information recorded in this manner is reproduced using the reproduction device 9 such as a giant magnetoresistance (GMR) device, or the like.

To perform high density recording using the HAMR head 1, a light spot formed by a laser ray should be very small. For example, a light spot having a diameter of about 50 nm is required to realize a recording density of 1 $Tb/in^2$. Accordingly, HAMR has been studied to obtain a small light spot using a near field light. However, it is difficult incorporate a near field light emitter including a light source into a magnetic head manufactured through a related art thin film process.

SUMMARY OF THE INVENTION

The present invention provides an HAMR head and method of manufacturing the same, capable of easy manufacturing by improving the structure and arrangement of a near field light emitter.

According to an aspect of the present invention, there is provided an HAMR head mounted on a slider having an air-bearing surface (ABS) that faces a recording medium, the HAMR head comprising: a substrate which is attached on one side of the slider; a recording unit formed on the substrate and having a stepped end facing the ABS to allow magnetic flux to be condensed at the stepped end, thereby performing magnetic recording on the recording medium; a waveguide located in a space formed by the stepped end of the recording unit; and a near field light emission (NFE) pole located adjacent to the recording unit and having an end located on a same plane as the ABS to generate near field light which is transmitted through the waveguide to illuminate the recording medium.

According to another aspect of the present invention, there is provided a method of manufacturing an HAMR head, the method including forming a cladding layer on a substrate; forming a first metal layer on the cladding layer; etching a part of the first metal layer such that a cross-section of the etched part of the first metal layer is inclined with respect to the cladding layer; forming a core layer on a region of the cladding layer where the first metal layer is etched and removed; forming a refraction part in a part of the core layer; forming a second metal layer on a region where the first metal layer and the core layer contact; and forming a recording unit on the second metal layer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE PRESENT INVENTION

Figure 2:
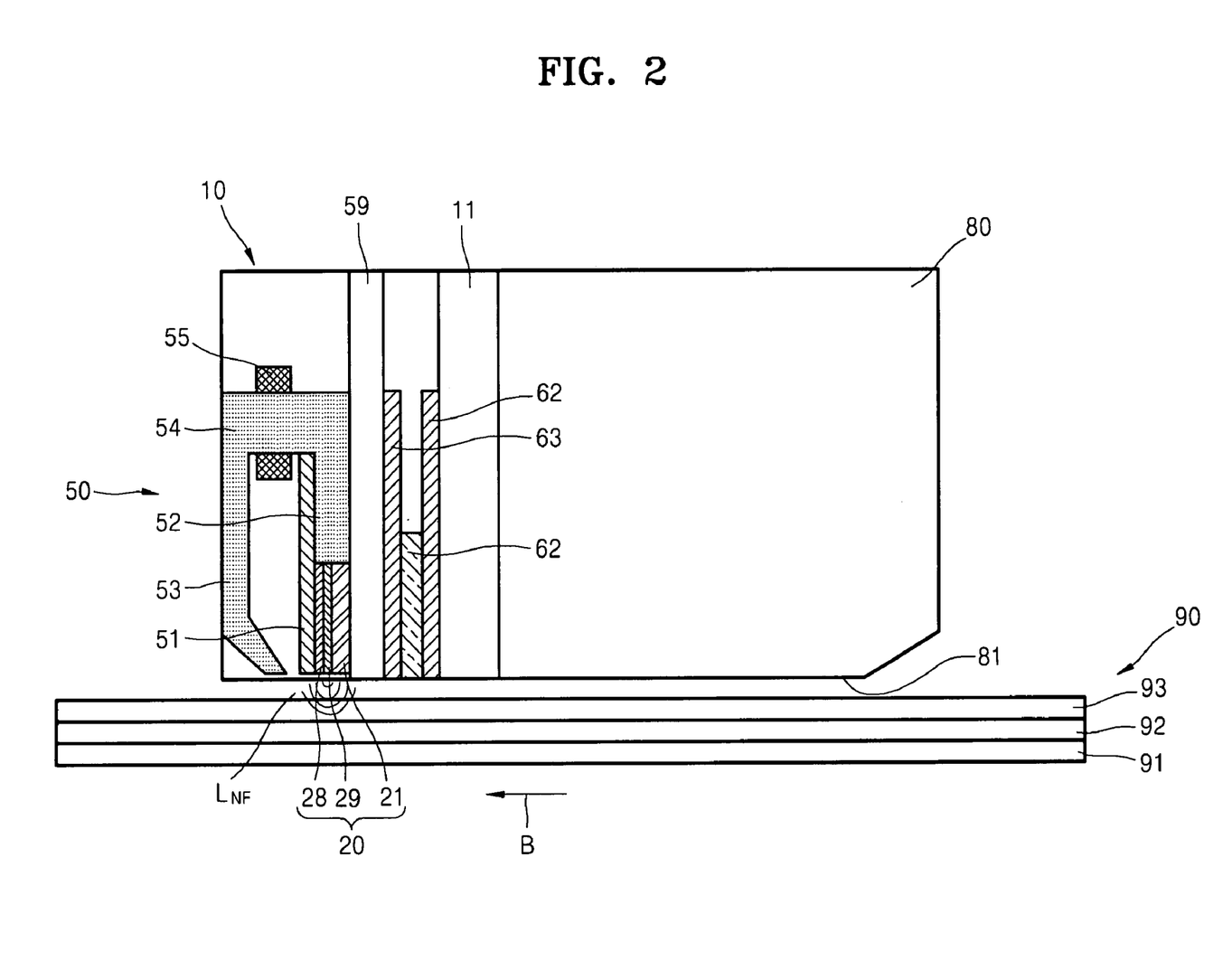
FIG. 2 is a schematic sectional view of an HAMR head according to an exemplary embodiment of the present invention.

FIG. 2 is a schematic sectional view of an HAMR head according to an exemplary embodiment of the present invention.

Referring to FIG. 2, the HAMR head 10 includes a substrate 11, a recording unit 50 located on the substrate 11, and a near field light emitter 20 located in a space formed by a stepped portion of the recording unit 50.

The HAMR head 10 is mounted on one end of a slider 80. The slider 80 has an air bearing surface (ABS) 81 that is processed and faces a recording medium 90 such that the slider 80 is floated by an active air pressure generated by relative movement of the slider 80 with respect to the recording medium 90.

The recording unit 50 includes a recording pole 51 magnetizing the recording medium 90, a return pole 53 spaced apart a distance, which may be predetermined, from one side of the recording pole 51, a yoke 54 magnetically coupled the recording pole 51 with the return pole 53, a sub-yoke 52 provided on the other side of the recording pole 51 to help condense a magnetic flux to the end of the recording pole 51, and an induction coil 55 inducing a magnetic field to the recording pole 51. Furthermore, the HAMR head 10 may further include a shield layer 59 shielding a stray field. The shield layer 59 is located on the substrate 11, and the near field light emitter 20 and the recording unit 50 are located on the shield layer 59.

The sub-yoke 52 is attached on the other side of the recording pole 51 and has a stepped structure such that the end of the sub-yoke 52 that faces the ABS 81 has a step with respect to the end of the recording pole 51. Therefore, a space, which may be predetermined, is formed near the end of the sub-yoke 52 that faces the ABS 81 to receive the near field light emitter 20. Since the space formed by the step of the sub-yoke 52 can be secured in a conventional magnetic recording head structure, it is possible to manufacture the HAMR head according to an exemplary embodiment of the present invention without significantly changing a process of manufacturing the conventional magnetic recording head.

Also, the HAMR head 10 may be integrated together with a reproduction unit 60, which includes a reproduction device 61 such as a giant magnetoresistance (GMR) device, and insulation layers 62 and 63 formed of non-magnetic materials surrounding the reproduction device 61. The HAMR head 10 and the reproduction unit 60 may be collectively manufactured through a thin film manufacturing process, or the like.

The recording medium 90 includes a base 91, a soft magnetic material layer 92 stacked on the base 91, and a recording layer 93 stacked on the soft magnetic material layer 92, the recording layer 93 formed of a ferromagnetic material. An arrow B represents a relative movement direction of the recording medium 90 with respect to the HAMR head 10.

The near field light emitter 20 includes a thin film type waveguide 21 and an NFE pole 29.

The NFE pole 29 is located between the recording pole 51 and the waveguide 21 such that the end of the NFE pole 29 and the end of the recording pole 51 exist on the same plane as that of the ABS 81.

A light source (not shown) supplying light to the near field light emitter 20 may be a laser diode, for example, or other similar light source. The light source may be located in the slider 80 as described below. However, the location of the light source is not limited to this. For example, the light source may be installed to the outside of the slider 80 to supply light to the waveguide 21 through an optical fiber.

The NFE pole 29 emits near field light at the end of the NFE pole 29 using light transmitted through the waveguide 21. The near field light $L_{NF}$ emitted from the NFE pole 29 heats the local area of the recording layer 93 to reduce coercive force of the local area. As the recording medium 90 moves in a direction B, the heated local area is immediately moved to the end of the recording pole 51 and magnetized by leakage magnetic flux generated from the end of the recording pole 51. The leakage magnetic flux is induced by the induction coil 55 and changes the direction of a magnetic field, thereby sequentially changing the magnetization vectors of the recording layer and recording information. The induced magnetic flux comes out of the recording pole 51 and constitutes a closed loop that passes through the soft magnetic layer 92, the return pole 53, and the yoke 54.

The near field light emitter 20 may further include a thermal conduction prevention layer 28 located between the recording pole 51 and the NFE pole 29 to block heat generated from the NFE pole 29.

Figure 3A:
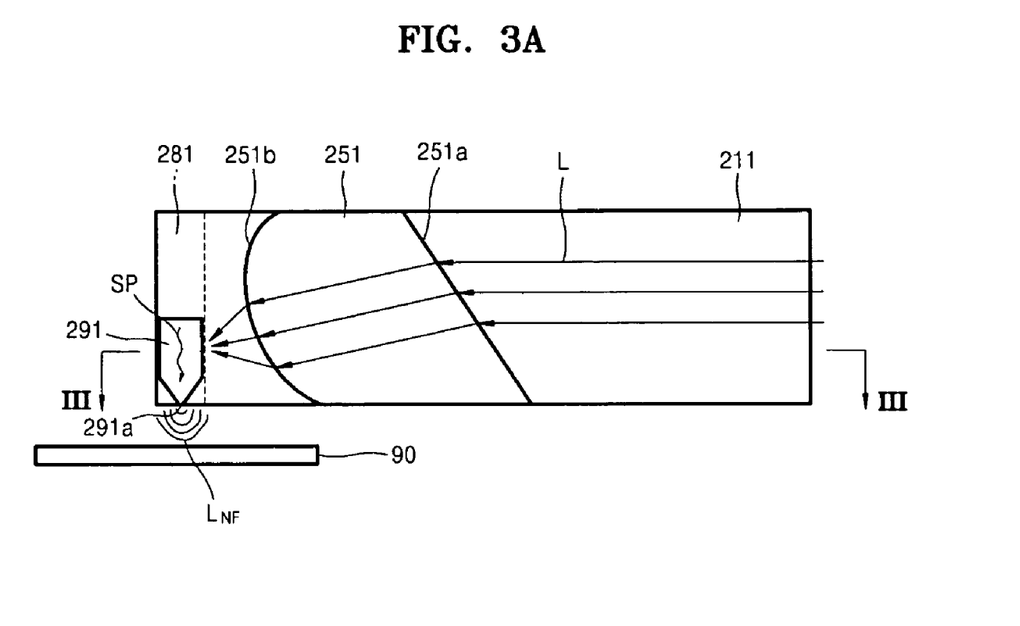
FIGS. 3A and 3B are a side view and a sectional view of a near field light emitter, respectively, illustrating a waveguide and an NFE pole according to an exemplary embodiment of the present invention.
Figure 3B:
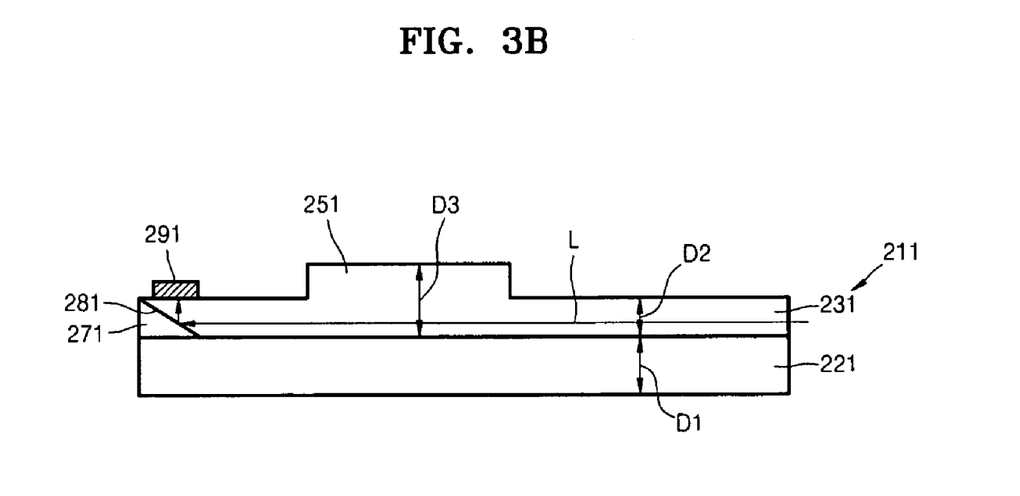

FIGS. 3A and 3B illustrate a waveguide and an NFE pole according to an exemplary embodiment of the present invention. That is, FIG. 3A is a side view of the waveguide and the NFE pole, and FIG. 3B is a sectional view along a line III-III of FIG. 3A.

The waveguide 211 includes a cladding layer 221, and a core layer 231 stacked on the cladding layer 221. A cover layer may be further stacked on the core layer 231. According to the present exemplary embodiment, the cover layer is an air layer having a refractive index 1 (not shown).

Since the waveguide 211 transmits light L using total internal reflection, it is advantageous for the refractive indexes of the cladding layer 221 and the cover layer to be smaller than that of the core layer 231. For that purpose, each of the cladding layer 221 and the cover layer may be formed of one of $SiO_2$, $CaF_2$, $MgF_2$, and $Al_2O_3$ materials, and the core layer 231 may be formed of one of SiN, $Si_3N_4$, $TiO_2$, $ZrO_2$, $HfO_2$, $Ta_2O_5$, $SrTiO_3$, GaP, and Si materials. When GaP or Si is used for the core layer 231, incident light may be near infrared light rather than visible light having high absorption for GaP or Si.

Part of the core layer constitutes a refraction part 251. Light incident to the waveguide 211 propagates through the core layer 231. The refraction part 251 refracts the light L incident to the waveguide 211 to allow the path of the light L transmitted through the waveguide 211 to be inclined toward the ABS 81.

The refraction part 251 may be a mode index lens that can be manufactured integrally with the waveguide 211 through a thin film manufacturing process. The mode index lens changes a refractive index or an effective refractive index $n_{eff}$ to generate refraction in a thin film type waveguide. In the present exemplary embodiment, the effective refractive index $n_{eff}$ has changed.

Figure 4:
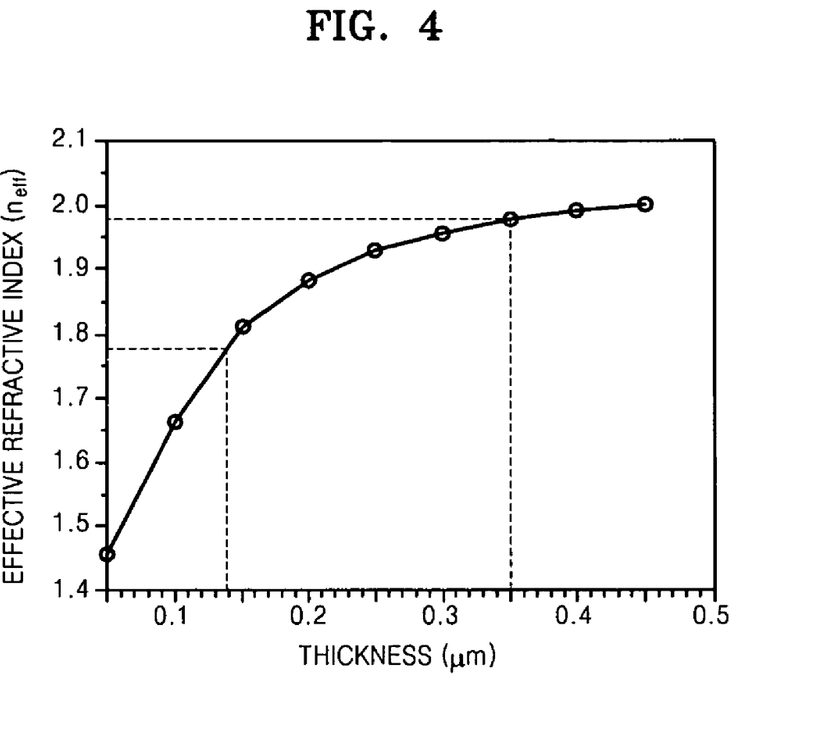
FIG. 4 is a graph illustrating effective refractive index versus thickness of waveguide core.

FIG. 4 is a graph illustrating an effective refractive index $n_{eff}$ versus the thickness of the core layer 231 in a basic mode when a layer light having a wavelength 488 nm is incident to the waveguide 211 illustrated in FIG. 3B. In this illustrative case, the cladding layer 221 is formed of $SiO_2$ having a refractive index 1.413 and has a thickness D1 of 1,000 nm. The core layer 231 is formed of $Si_3N_4$ having a refractive index 2.041 and has a thickness changing in a range of 50-450 nm. Referring to FIG. 4, the effective refractive index $n_{eff}$ increases as the thickness of the core layer 231 increases. For example, when the thickness of the core layer 231 is 140 nm, the effective refractive index $n_{eff}$ is about 1.793. When the thickness of the core layer 231 is 350 nm, the effective refractive index $n_{eff}$ is about 1.977. Here, the effective refractive index $n_{eff}$ means the ratio of the speed of light in a free space to the speed of light propagating through a waveguide. When light propagates through a waveguide, the light propagates in a certain mode, which may be predetermined, and the effective refractive index $n_{eff}$ of the waveguide with respect to light propagating through the waveguide changes depending on the mode of the light. Also, a mode allowed in a waveguide changes depending on the shape of the waveguide. In the case of a flat core layer, the effective refractive index $n_{eff}$ changes depending on the thickness of the core layer. For example, the thickness D2 of the core layer 231 may be about 140 nm, and the thickness D3 of the refraction part may be about 350 nm.

Referring to FIGS. 3A and 3B again, the refraction part and the NFE pole will be described.

The incident plane of the refraction part 251 may be inclined with respect to the ABS 81 to refract light L transmitted through the waveguide 211 toward the ABS 81 and thus change an optical path toward an NFE pole 291 located closely to the ABS 81. Also, an emitting plane 251b of the refraction part 251 may be a curved surface having a positive refractive power to condense light L that has passed through the refractive part 251 to the NFE pole 291.

The NFE pole 291 includes a metal thin film stacked at an edge on one side of the core layer 231. The recording pole 51 (of FIG. 2) is disposed on the NFE pole 291.

The end of the core layer 231 where the NFE pole 291 is formed is inclined with respect to the cladding layer 221 to reflect the light transmitted through the core layer 231 to the NFE pole 291. It is possible to improve reflection efficiency by replacing part of the core layer 231 with a metal layer 271 so that a boundary between the metal layer 271 and the core layer 231 becomes a reflection mirror surface.

The NFE pole 291 includes a metal thin film where a surface plasmon (SP) is generated by light illuminated through the waveguide 211. The metal thin film may be formed of metal having good conductivity properties and selected from the group consisting of Au, Ag, Pt, Cu, and Al, or the like. The metal thin film may have a thickness larger than a skin depth so that excitation of an SP is easily generated. Also, the NFE pole 291 may be surrounded by a dielectric material (not shown) in order to enhance coupling efficiency between incident light and an SP.

Figure 5:
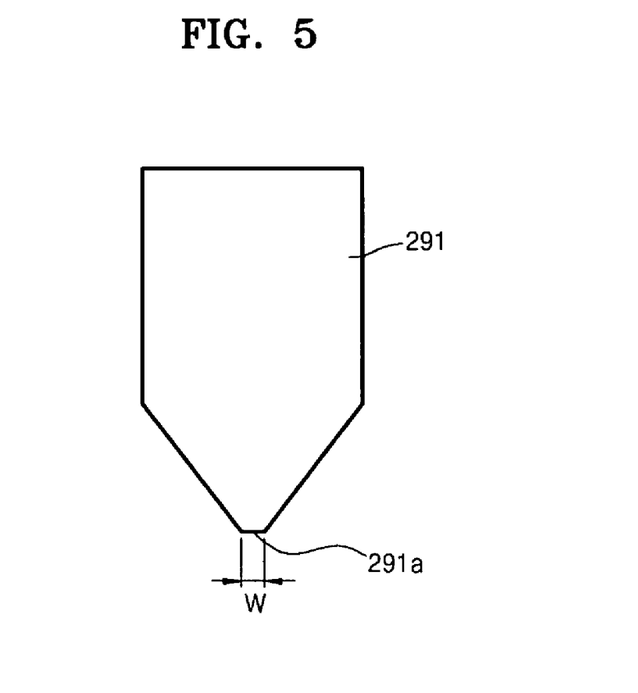
FIG. 5 is a schematic plan view of an NFE pole of FIG. 3A according to an exemplary embodiment of the present invention.

An SP excited by light illuminated through the waveguide 211 propagates to the end 291a of the NFE pole 291 that is close to the ABS 81. Referring to FIG. 5, the NFE pole 291 may have narrower width as the NFE pole 291 approaches the ABS 81. In this case, the speed of the SP decreases as the area of the NFE pole 291 decreases. Localized SP whose intensity is strengthened is excited at the end 291a, so that near field light $L_{NF}$ (of FIG. 3A) is emitted. Since the emitted near field light $L_{NF}$ may have a beam size smaller than a diffraction limit, it is possible to increase the density of recorded information by reducing a pitch interval when recording magnetic information on the recording medium 90. The width W of the end 291a of the NFE pole 291 may be equal to or smaller than the track pitch of the recording medium 90. That is, the width W of the end 291a may be equal to or smaller than the width of the recording pole 51 (of FIG. 2). By doing so, it is possible to prevent the near field light $L_{NF}$ from being illuminated onto other regions except a track on which magnetic recording is to be performed and thus recorded information is not damaged. However, the width W of the NEF pole 291 is not limited to this.

Since the near field light $L_{NF}$ generated from the NFE pole 291 drastically reduces as it is spaced farther from the NFE pole 291, the distance between the ABS 81 and the recording medium 90 may be in a range of 2 nm to 100 nm within which the near field light is still effective.

Figure 6A:
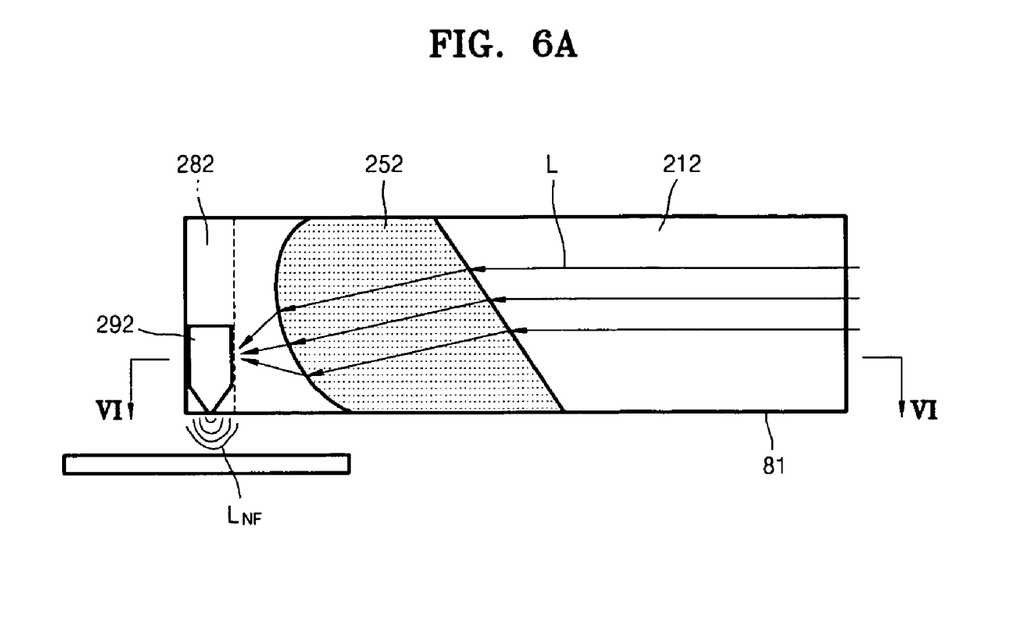
FIGS. 6A and 6B are a side view and a sectional view of a near field light emitter, respectively, illustrating a waveguide structure according to another exemplary embodiment of the present invention.
Figure 6B:
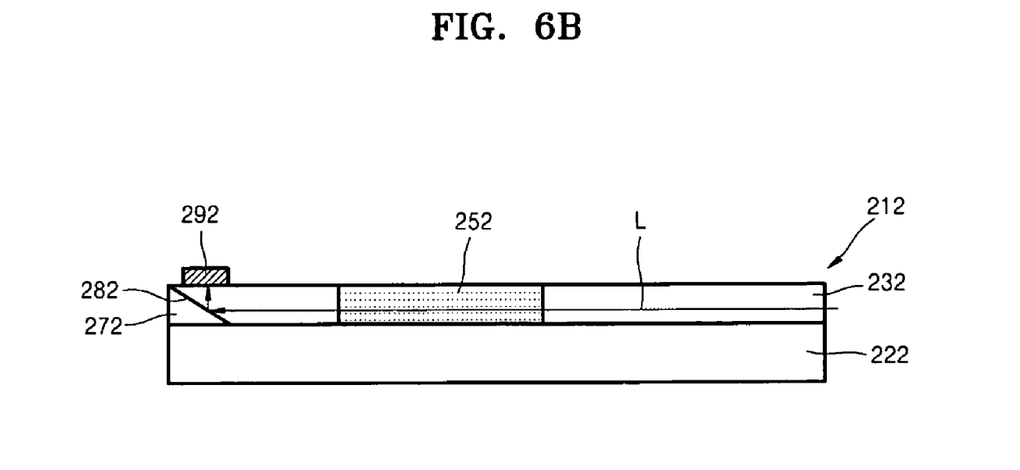

FIGS. 6A and 6B illustrate a waveguide according to another exemplary embodiment of the present invention. FIG. 6A is a side view of a waveguide and an NFE pole, and FIG. 6B is a sectional view along a line VI-VI of FIG. 6A. The structure and operation of the waveguide 212 according to the present exemplary embodiment are substantially the same as those of the waveguide 211 (of FIG. 3A) according to an exemplary embodiment of the present invention described with reference to FIGS. 3A and 3B. Therefore, descriptions thereof will be omitted, and instead, description will be made mainly for a refraction part 252 of the waveguide 212.

The waveguide 212 includes a cladding layer 222, a core layer 232 stacked on the cladding layer 222, and the refraction part 252 formed in part of the core layer 232.

The refraction part 252 according to the present exemplary embodiment is a mode index lens having a refractive index formed by implanting ions into part of the core layer 212. Since it is well known in the art that a refractive index changes when a composition ratio of the constituents of the core layer 212 changes, detailed description thereof will be omitted. In the present exemplary embodiment, unlike the waveguide 211 (of FIG. 3A) according to an exemplary embodiment of the present invention described with reference to FIGS. 3A and 3B, the thickness of the core layer 232 does not change.

Figure 7A:
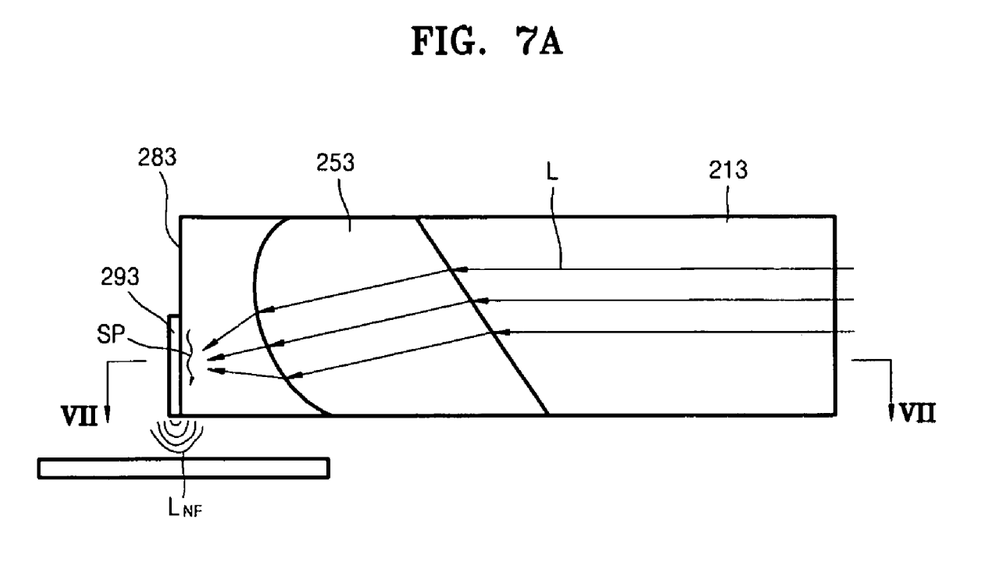
FIGS. 7A and 7B are a side view and a sectional view of a near field light emitter, respectively, illustrating an NFE pole structure according to another exemplary embodiment of the present invention.
Figure 7B:
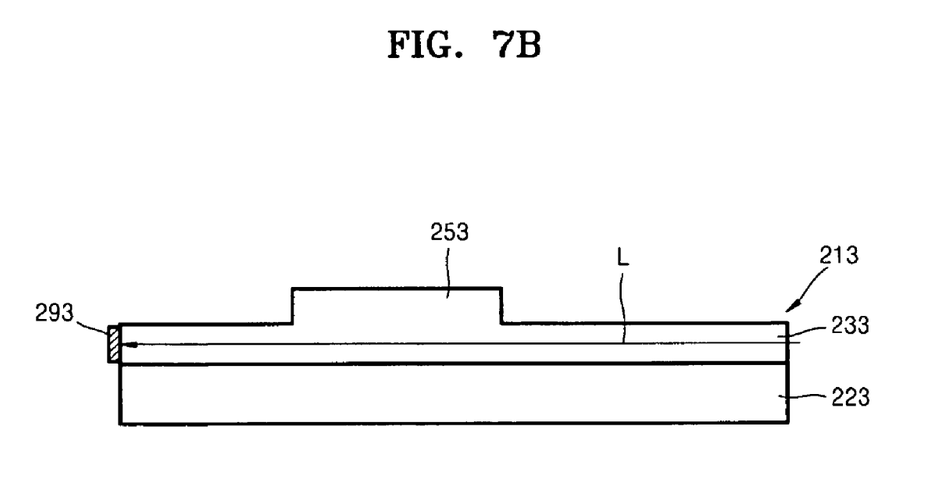

FIGS. 7A and 7B illustrate an NFE pole according to another exemplary embodiment of the present invention. FIG. 7A is a side view of a waveguide and an NFE pole, and FIG. 7B is a sectional view along a line VII-VII of FIG. 7A.

The NFE pole 293 according to the present exemplary embodiment is a metal thin film formed at one end of the core layer 233. Light transmitted through a waveguide 213 is immediately illuminated onto the NFE pole 293. The NFE pole 293 is formed perpendicularly to a plane where the waveguide 213 exists. The end of the NFE pole 293 is located close to the end of the recording pole.

Figure 8A:
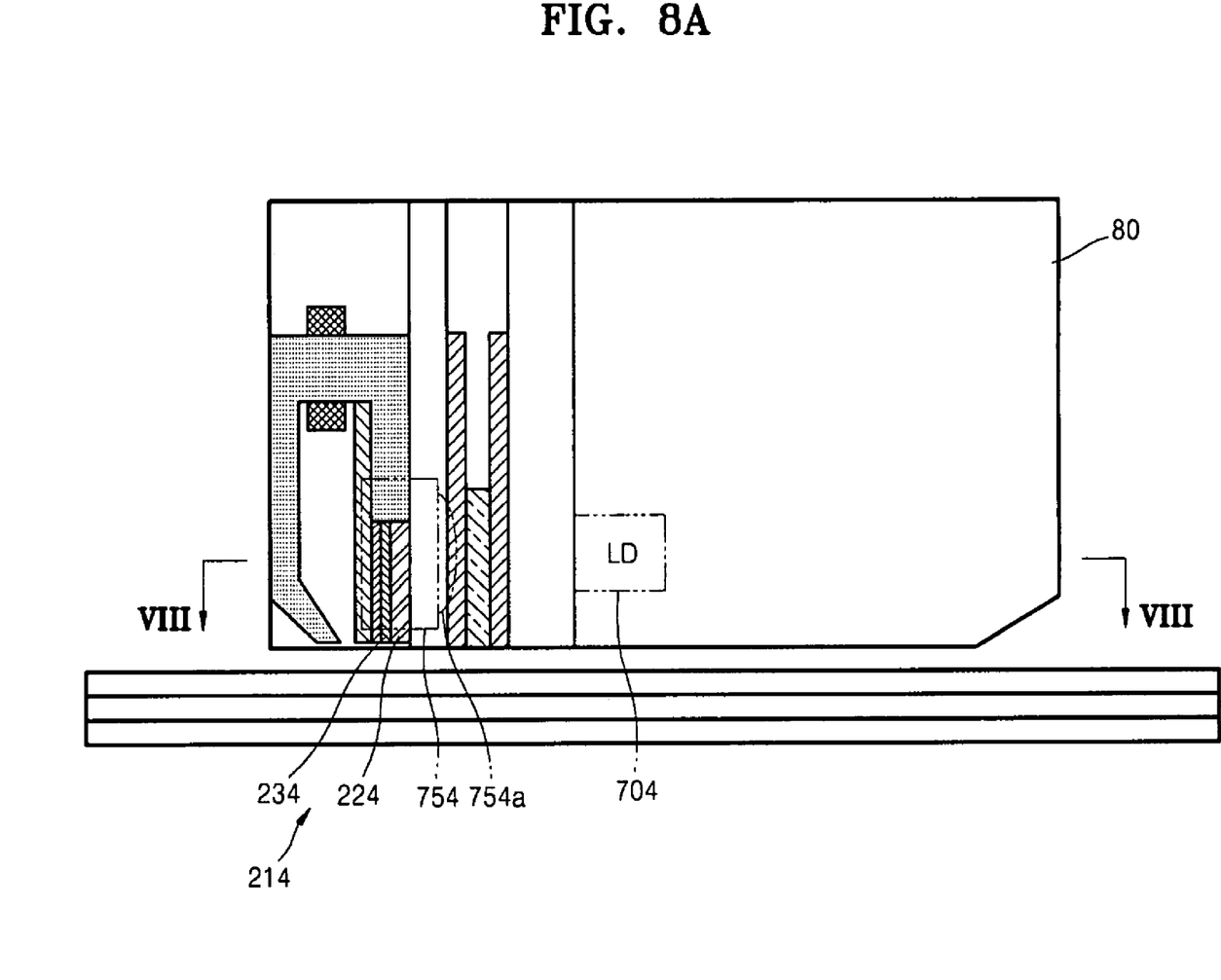
FIGS. 8A and 8B are a side sectional view and a partial sectional view of an HAMR head, respectively, illustrating arrangement of a light source according to an exemplary embodiment of the present invention.
Figure 8B:
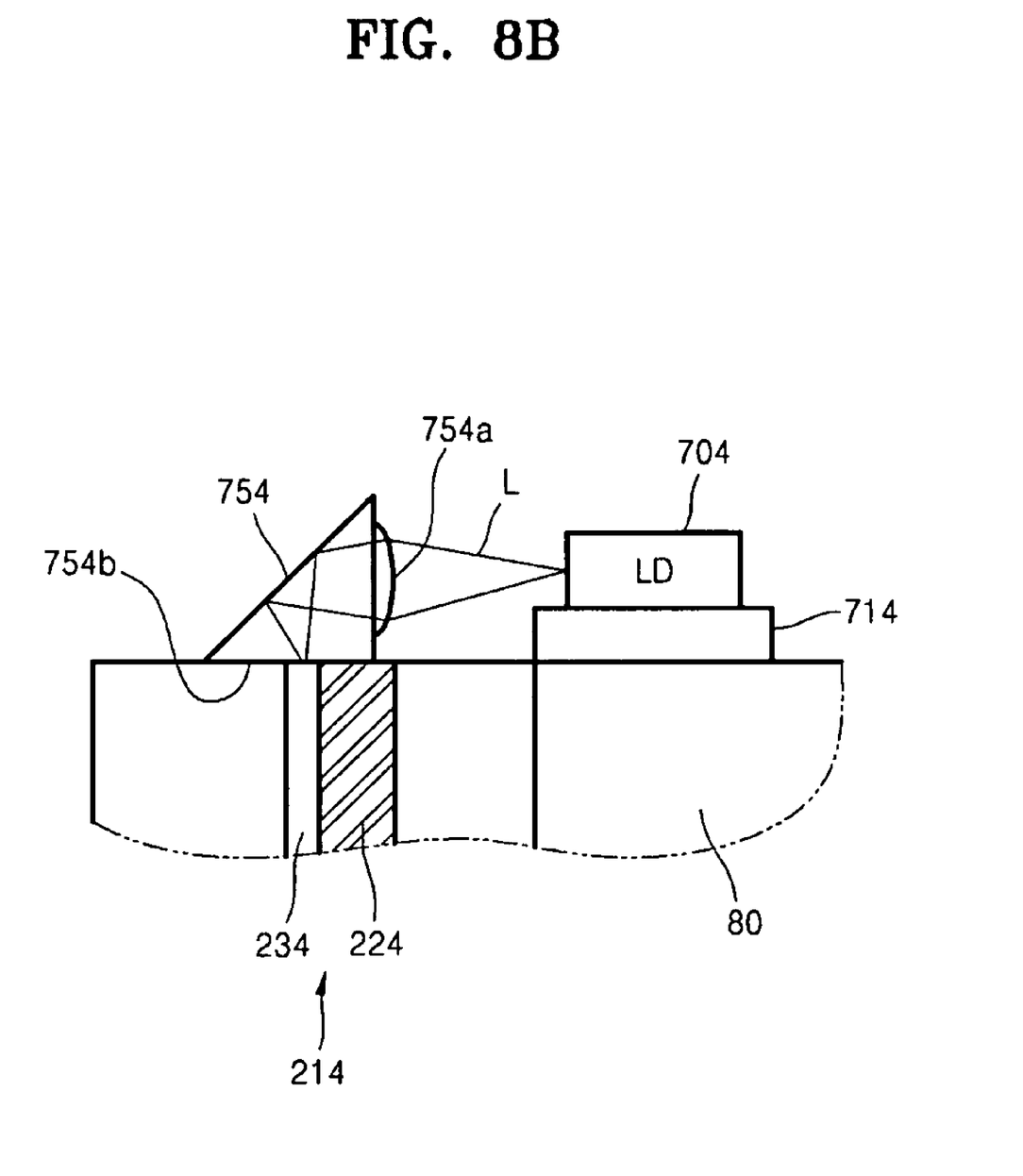

FIGS. 8A and 8B illustrate coupling of light emitted from a light source to a waveguide according to an exemplary embodiment of the present invention. FIG. 8A is a side view of a slider where an HAMR head is mounted, and FIG. 8B is a partial sectional view along a line VIII-VIII of FIG. 8A.

According to the present exemplary embodiment, a light source 704 is installed on the other side of the slider 80. Thus, it is possible to simplify a structure of transmitting light up to the NFE pole 29 (of FIG. 2) and maintain constant light coupling efficiency even when vibration or impulse is generated by installing the light source 704 on the slider 80.

The end of the waveguide 214 that is close to the light source 704 exists on the same plane as that of the other side of the slider 80. According to the present exemplary embodiment, an HAMR head includes a prism coupler 754 in order to couple light emitted from the light source 704 to the waveguide 214. The prism coupler 754 includes an incident plane 754a that faces the light source 704, and an emitting plane 754b contacting the end of the waveguide 214 that is close to the other side of the slider 80. Therefore, light that is emitted from the light source 704 and propagates in a lateral direction of the slider 80 changes its optical path at the prism coupler 754 and is incident into the waveguide 214.

An incident plane 754a of the prism coupler 754 that faces the light source 704 may be a curved surface having positive refractive power. In this case, light emitted from the light source 704 is incident to the prism coupler 754 and condensed by the prism coupler 754.

Reference numeral 714 denotes a sub-mount. The sub-mount 714 is mounted on the slider 80, and the light source 704 is mounted on the sub-mount 714, which may be formed of a material having excellent thermal conductivity in order to efficiently emit heat generated from the light source 704.

Figure 9A:
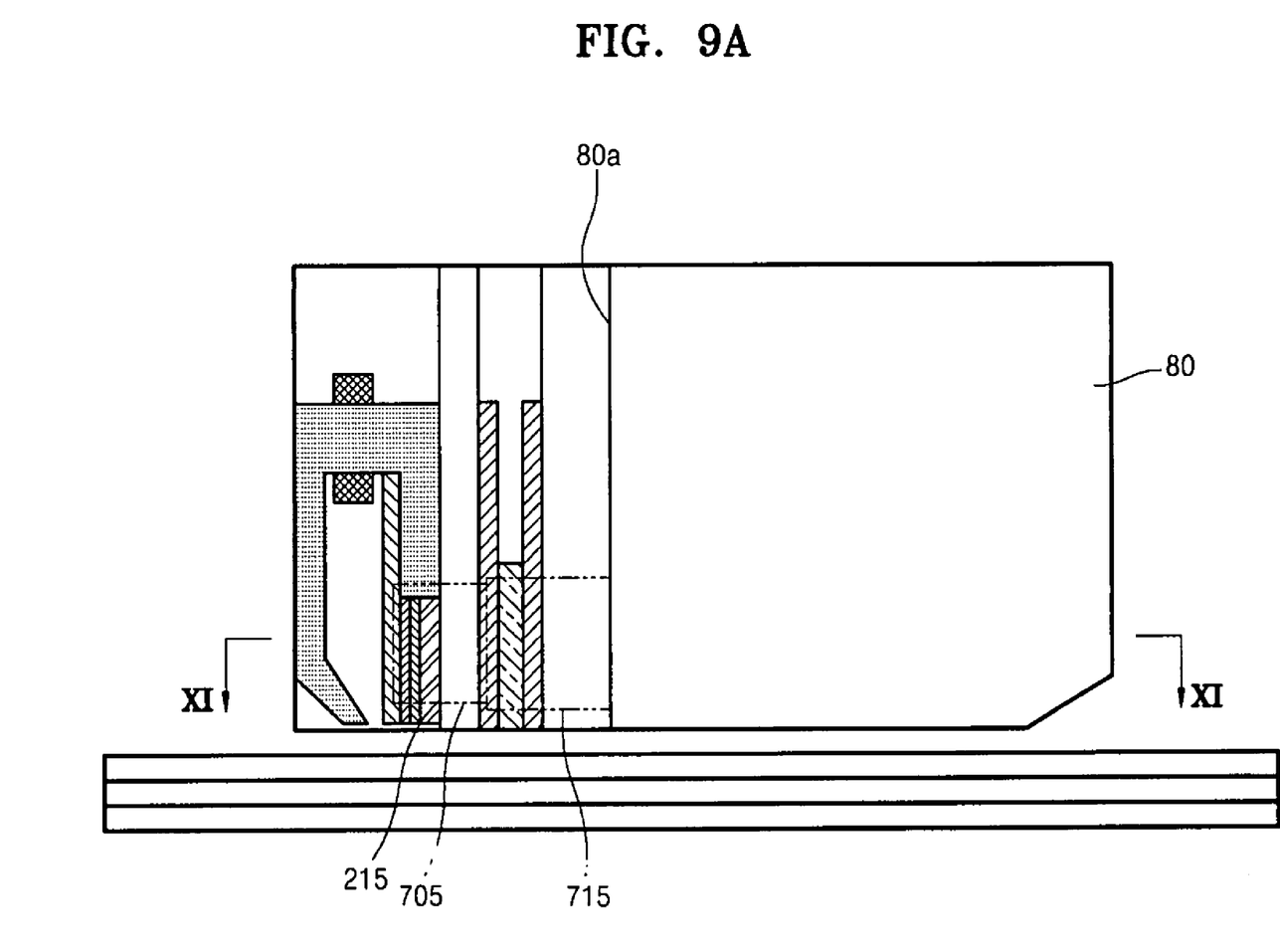
FIGS. 9A and 9B are a side sectional view and a partial sectional view of an HAMR head, respectively, illustrating arrangement of a light source according to another exemplary embodiment of the present invention.
Figure 9B:
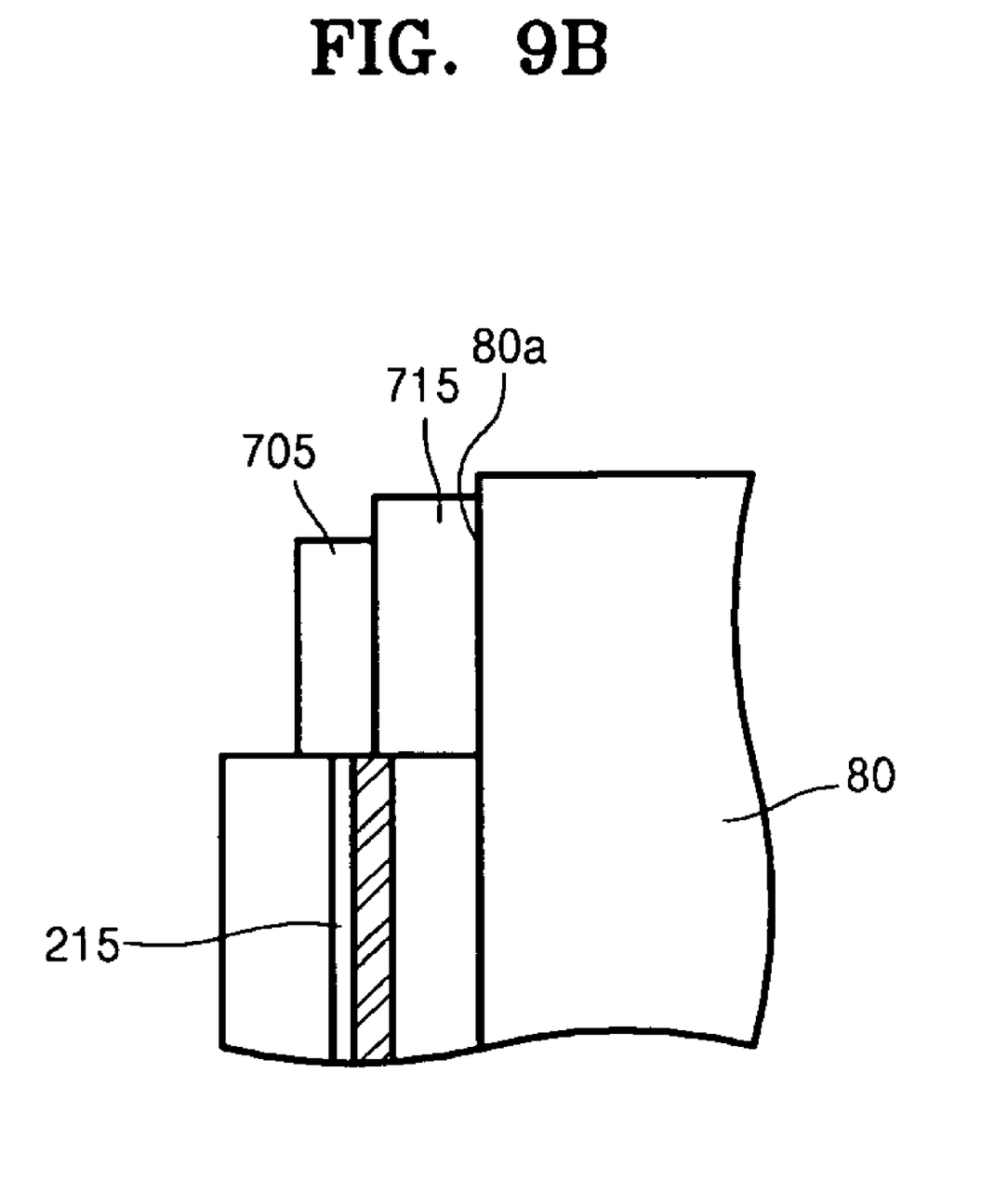

FIGS. 9A and 9B illustrate coupling of light emitted from a light source to a waveguide according to another exemplary embodiment of the present invention. FIG. 9A is a side view of a slider where an HAMR head is mounted, and FIG. 9B is a partial sectional view along a line IX-IX of FIG. 9A.

According to the present exemplary embodiment, the light source 705 and the magnetic recording head including a waveguide 215 are mounted together, side by side, on one side 80a of a slider 80. The light source 705 directly contacts the end of the waveguide 215 to perform direct butt coupling. Reference numeral 715 denotes a sub-mount on which the light source 705 is mounted.

Figure 10A:
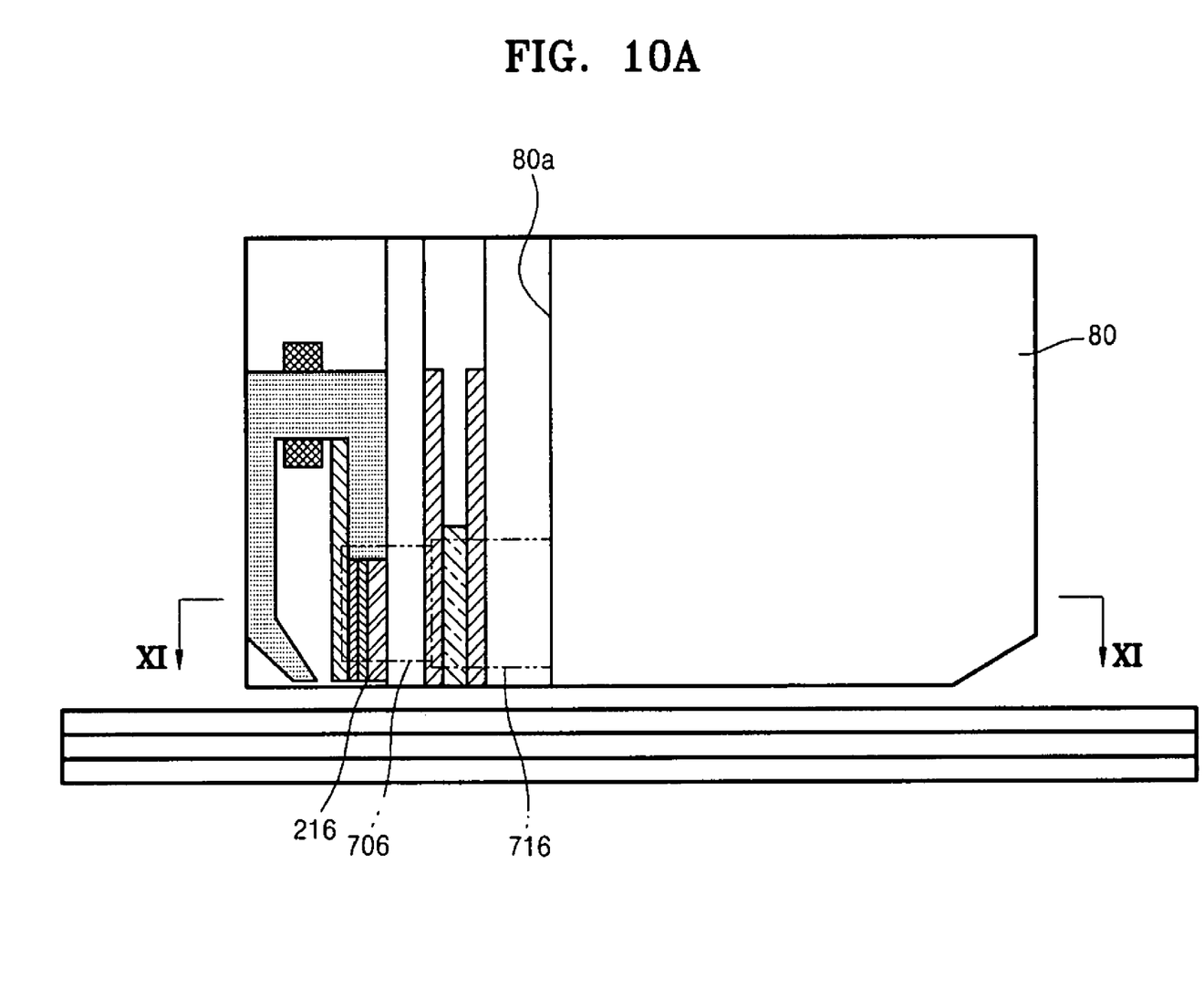
FIGS. 10A and 10B are a side sectional view and a partial sectional view of an HAMR head, respectively, illustrating arrangement of a light source according to another exemplary embodiment of the present invention.
Figure 10B:
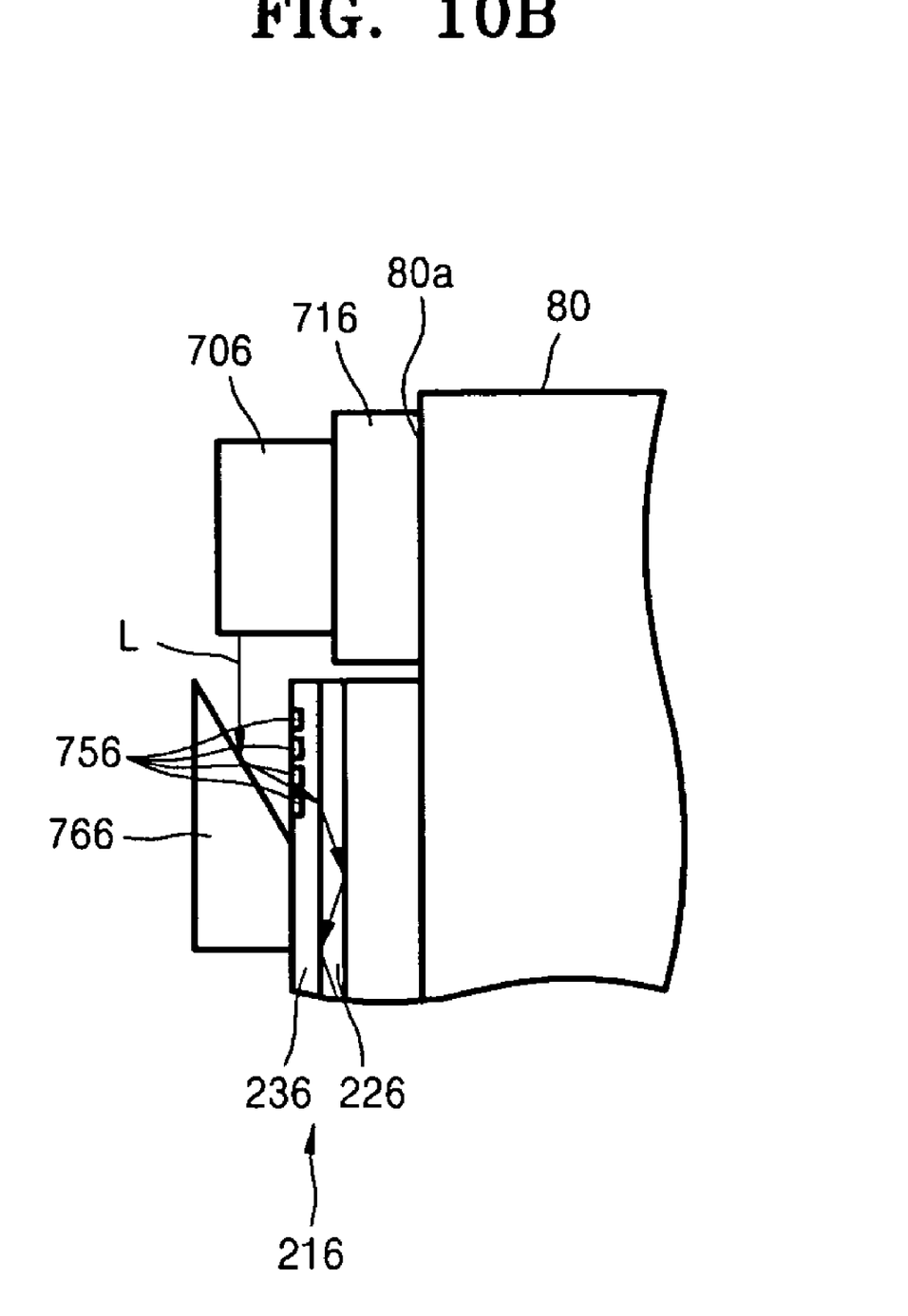

FIGS. 10A and 10B illustrate coupling of light emitted from a light source to a waveguide according to another exemplary embodiment of the present invention. FIG. 10A is a side view of a slider where an HAMR head is mounted, and FIG. 10B is a partial sectional view along a line X-X of FIG. 10A.

According to the present exemplary embodiment, the HAMR head includes a grating coupler 756 coupling light L emitted from the light source 706 to the waveguide 216. The grating coupler 756 includes a plurality of grooves formed in a plane of the waveguide 216 that is close to the light source 706. The grating coupler 756 may be formed in a plane of a core layer 236 that is close to the light source 706, or in a boundary between a cladding layer 226 and the core layer 236. The light source 706 and the magnetic recording head including the waveguide 216 are mounted together, side by side, on the same plane as that of the slider 80. Light L emitted from the light source 706 is reflected at a reflection mirror 766, passes through the grating coupler 756, and is incident into the core layer 236.

A method of manufacturing an HAMR head according to an exemplary embodiment of the present invention will now be described below. Since the recording unit 50 (of FIG. 2) generating leakage magnetic flux to perform magnetic recording is manufactured using a general thin film manufacturing process, detailed description thereof will be omitted. However, one skilled in the art will understand that other similar manufacturing processes may be used.

FIGS. 11A through 11D illustrate processes of a method of manufacturing a near field light emitter according to an exemplary embodiment of the present invention.

Figure 11A:
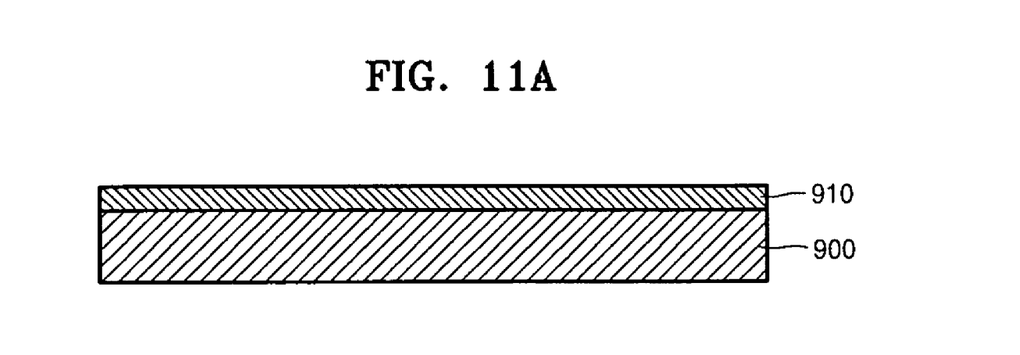
FIGS. 11A through 11D are views illustrating, step by step, a process of manufacturing an HAMR head according to an exemplary embodiment of the present invention.

First, referring to FIG. 11A, a cladding layer 910 is stacked on a substrate 900.

Figure 11B:
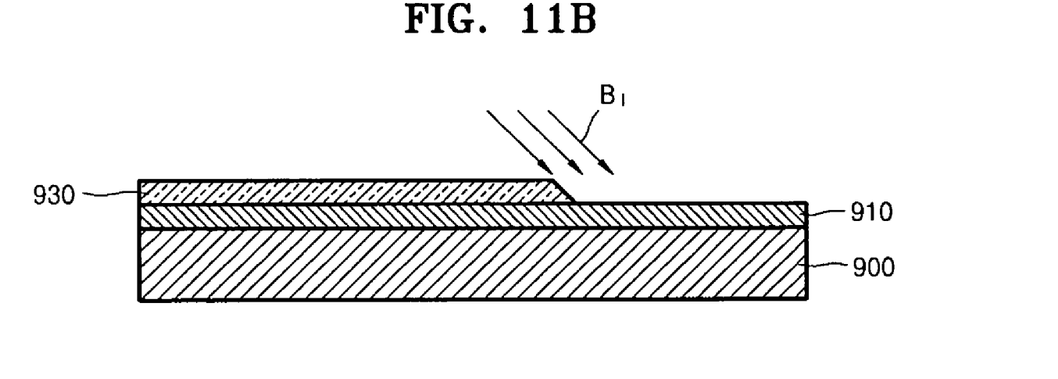

Next, referring to FIG. 11B, a first metal layer 930 is stacked on the cladding layer 910, and part of the first metal layer 910 is etched such that the cross-section of the etched portion is inclined with respect to the cladding layer 910. The etching of the first metal layer 910 may be performed using ion milling, which illuminates an ion beam to perform etching. However, other similar etching processes may also be used.

Figure 11C:
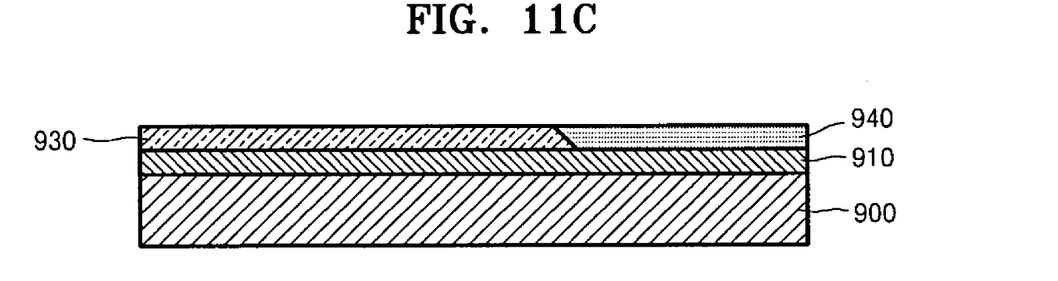

Next, referring to FIG. 11C, a core layer 940 is formed with the same thickness as that of the first metal layer 930 in the etched portion of the first metal layer 930. By doing so, the end of the core layer 940 that contacts the first metal layer 930 becomes a reflection surface.

Figure 11D:
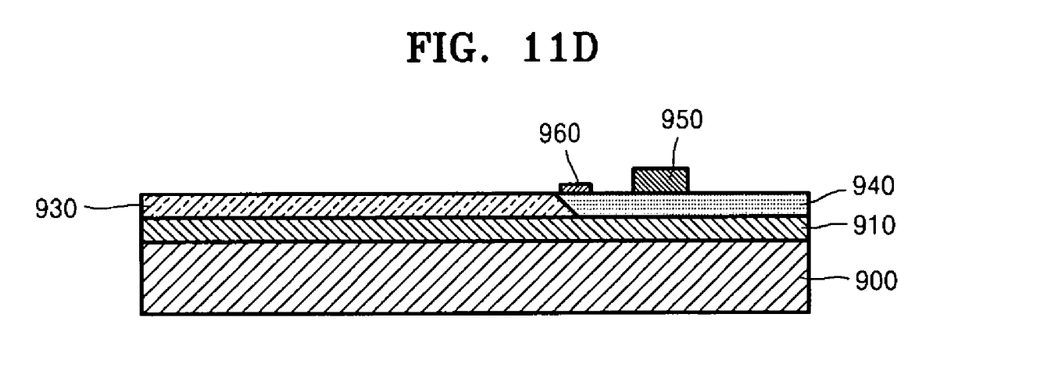

Subsequently, referring to FIG. 11D, a refraction part 950 is formed on the core layer 940. The refraction part 950 may be formed by stacking the same material as that of the core layer 940 on part of the core layer 940 as illustrated. After that, a second metal layer 960 is formed on a boundary between the first metal layer 930 and the core layer 940. The second metal layer 960 corresponds to an NFE pole.

Through above-described process, a waveguide and an NFE pole may be manufactured, and it is possible to complete an HAMR head by stacking a recording pole, an induction coil, and a return pole on the waveguide and the NFE pole using a general thin film process, or other similar process.

Though not shown, a reproduction device may be stacked on the substrate 900 before the cladding layer 910 is stacked. In such a case, the cladding layer 910 and the core layer 940 may be formed of a polymer, and the waveguide may be manufactured at low temperature in order not to influence the magnetic properties of the reproduction device.

As described above, since the waveguide and the NFE pole may be manufactured together with other parts of the HAMR head using a thin film manufacturing process, they can be easily manufactured, and optical parts constituting the near field light emitter may be manufactured in a lightweight, small and slim size.

Though the near field light emitter and the recording unit are sequentially stacked on the substrate in the above-described exemplary embodiments, the stacking order may change. Even in this case, the HAMR head is mounted on the slider so that the recording medium is heated by the near field light emitter before magnetic recording is performed by the recording pole. Also, the HAMR head according to exemplary embodiments of the present invention is not limited to perpendicular magnetic recording or horizontal magnetic recording.

As is apparent from the above descriptions, the HAMR head and the method of manufacturing the same according to the present invention have the following illustrative effects.

First, since the space surround by the recording pole, the sub-yoke, and the shielding layer can be formed in the conventional magnetic recording head structure, it is possible to manufacture the HAMR head according to an exemplary embodiment of the present invention without significantly changing a process of manufacturing the conventional magnetic recording head.

Second, it is possible to simplify a structure that transmits light up to the NFE pole and always maintain a constant optical coupling efficiency even when vibration or impulse occurs by installing the light source in the slider.

Third, since the waveguide and the NFE pole generating near field light may be manufactured together with other parts of the HAMR head using a thin film manufacturing process, they can be easily manufactured in lightweight, small and slim size.

While the present inventive concept has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A heat assisted magnetic recording (HAMR) head mounted on a slider having an air-bearing surface (ABS) that faces a recording medium, the HAMR head comprising:
   a substrate which is attached on one side of the slider;
   a recording unit formed on the substrate and having a stepped end facing the ABS to allow magnetic flux to be condensed at the stepped end, thereby performing magnetic recording on the recording medium;
   a waveguide located in a space formed by the stepped end of the recording unit;
   a near field light emission (NFE) pole located adjacent to the recording unit and having an end located on a same plane as the ABS to generate near field light to illuminate the recording medium
   a shield layer located on the substrate, wherein the recording unit and the waveguide are located on the shield layer; and
   a reproduction device located between the substrate and the shield layer, and having an end existing on the same plane as the ABS.

2. The HAMR head of claim 1, wherein the NFE pole comprises a metal thin film where a surface plasmon is excited by light illuminated through the waveguide to generate a near field at an end of the metal thin film.

3. The HAMR head of claim 2, wherein the NFE pole is located between a recording pole and the waveguide, and an end of the waveguide nearest the NFE pole comprises an inclined reflection mirror plane allowing light transmitted through the waveguide to be illuminated onto the NFE pole.

4. The HAMR head of claim 3, further comprising a thermal conduction prevention layer located between the recording pole and the NFE pole.

5. The HAMR head of claim 3, wherein a width of the NFE pole decreases as the NFE pole approaches the ABS.

6. The HAMR head of claim 3, wherein a width at an end of the NFE pole is equal to or smaller than a track pitch of the recording medium.

7. The HAMR head of claim 2, wherein the NFE pole comprises a metal thin film formed at an end of the waveguide.

8. A heat assisted magnetic recording (HAMR) head mounted on a slider having an air-bearing surface (ABS) that faces a recording medium, the HAMR head comprising:
   a substrate which is attached on one side of the slider;
   a recording unit formed on the substrate and having a stepped end facing the ABS to allow magnetic flux to be condensed at the stepped end, thereby performing magnetic recording on the recording medium;
   a waveguide located in a space formed by the stepped end of the recording unit; and
   a near field light emission (NFE) pole located adjacent to the recording unit and having an end located on a same plane as the ABS to generate near field light to illuminate the recording medium,
   wherein the waveguide has a refraction part which changes a path of light to be guided and refracts incident light into the waveguide to the ABS,
   the refraction part comprises a mode index lens, and
   the mode index lens changes the refractive index of a local portion of the waveguide by changing a composition ratio of constituents of a core layer of the waveguide.

9. A heat assisted magnetic recording (HAMR) head mounted on a slider having an air-bearing surface (ABS) that faces a recording medium, the HAMR head comprising:
   a substrate which is attached on one side of the slider;
   a recording unit formed on the substrate and having a stepped end facing the ABS to allow magnetic flux to be condensed at the stepped end, thereby performing magnetic recording on the recording medium;
   a waveguide located in a space formed by the stepped end of the recording unit;
   a near field light emission (NFE) pole located adjacent to the recording unit and having an end located on a same plane as the ABS to generate near field light to illuminate the recording medium; and
   a light source provided on the slider,
   wherein the light source is attached on a side of the slider opposite to the substrate, and a end of the waveguide nearest the light source exists on a same plane as the slider, and the HAMR head further comprises a prism coupler having one side facing the light source and the other side contacting the end of the waveguide to couple light emitted from the light source to the waveguide.

10. The HAMR head of claim 9, wherein a plane of the prism coupler that faces the light source comprises a curved surface having positive refractive power.

11. A heat assisted magnetic recording (HAMR) head mounted on a slider having an air-bearing surface (ABS) that faces a recording medium, the HAMR head comprising:
   a substrate which is attached on one side of the slider;
   a recording unit formed on the substrate and having a stepped end facing the ABS to allow magnetic flux to be condensed at the stepped end, thereby performing magnetic recording on the recording medium;

a waveguide located in a space formed by the stepped end of the recording unit;

a near field light emission (NFE) pole located adjacent to the recording unit and having an end located on a same plane as the ABS to generate near field light to illuminate the recording medium; and a light source provided on the slider, wherein the light source and the substrate are attached, side by side, on a side of the slider.

12. The HAMR head of claim 11, wherein the light source contacts an end of the waveguide to directly couple light to the waveguide.

13. The HAMR head of claim 11, further comprising a grating coupler having a plurality of grooves formed in a surface of the waveguide closest to the light source to couple light emitted from the light source to the waveguide.

* * * * *